Aug. 5, 1969     M. J. BERARDI     3,459,305

FILTERING APPARATUS

Filed July 13, 1966     2 Sheets-Sheet 1

INVENTOR
MARTIN J. BERARDI

BY *Bawyer and Witherspoon*

ATTORNEYS

United States Patent Office 3,459,305
Patented Aug. 5, 1969

3,459,305
FILTERING APPARATUS
Martin J. Berardi, 149 NE. 98th St.,
Miami Shores, Fla. 33153
Filed July 13, 1966, Ser. No. 564,877
Int. Cl. B01d 23/10
U.S. Cl. 210—134                                  3 Claims

ABSTRACT OF THE DISCLOSURE

Filtering apparatus is provided for purifying water, and other liquids, and which is constructed so that the water passes through a filter bed composed of activated charcoal, or other appropriate materials. A feature of the invention is the manner in which the incoming water is first circulated down to a lower chamber in the filter apparatus, and it is then passed up to the top of an upper chamber for subsequent filtration through the filtering material which is supported in the upper chamber. The apparatus is also constructed for the convenient backwashing of the filtering material in the upper chamber.

This invention relates to filtering apparatus and more particularly to a multi-unit filtering system of wide utility.

It is an object of this invention to provide a filtering system comprising a prefilter and final filter arrangement by which a highly efficient and effective filtration is obtained.

It is another object to provide a filtering system wherein the various filter units may be effectively backwashed in a rapid manner and with a minimum of backwash liquid.

It is yet another object to provide a filter unit in which no supporting gravel beds or the like are required.

It is a still further object to provide a filtering system which will handle a tremendous liquid volume compared to filter size thus producing savings of substantial proportions in initial equipment cost.

The above and other objects and advantages will become apparent when taken in conjunction with the following detailed description and drawings, showing by way of example a preferred embodiment of this invention and wherein.

Figure 1:
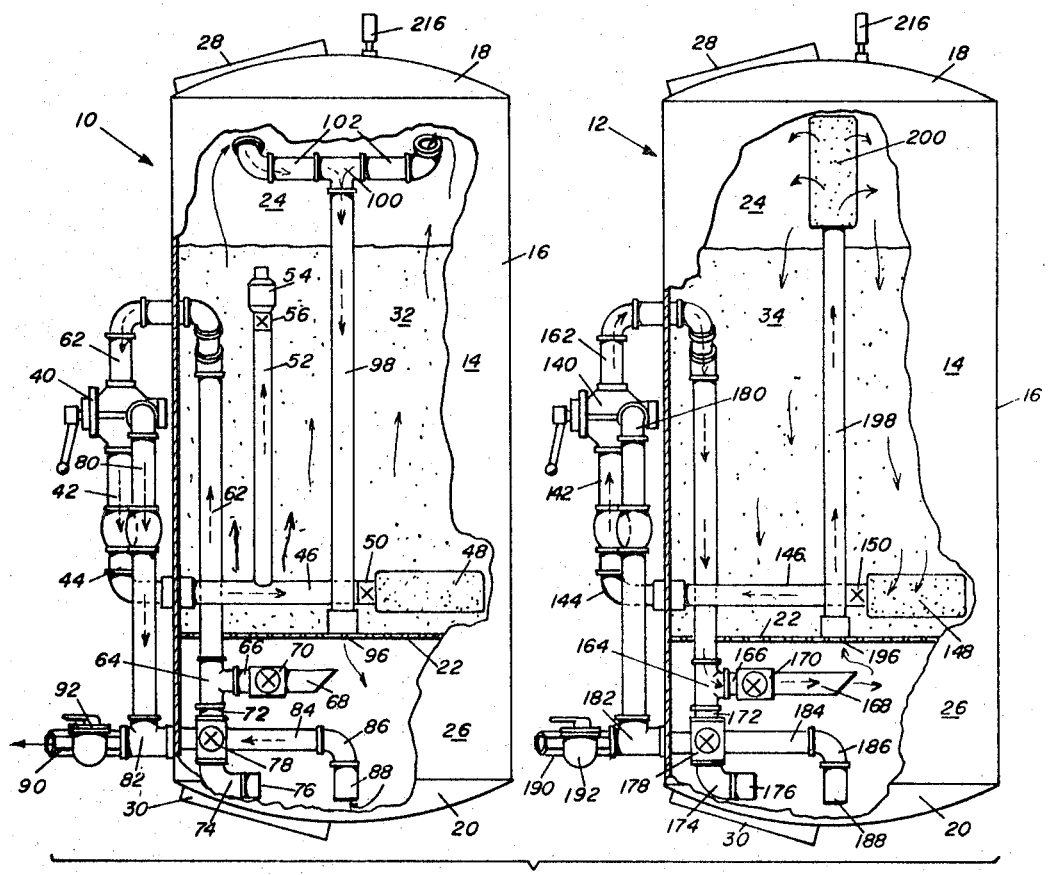
FIG. 1 is an elevational view showing a prefilter and final filter units with portions of their vertical walls broken away to show the internal structure of each unit.
Figure 2:
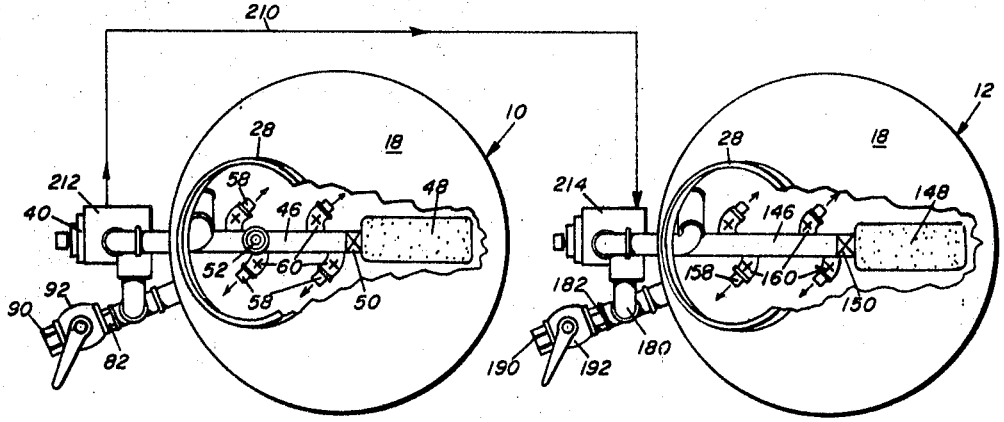
FIG. 2 is a top plan view of FIG. 1 with the top of each unit partly broken away to illustrate structure therein.
Figure 3:
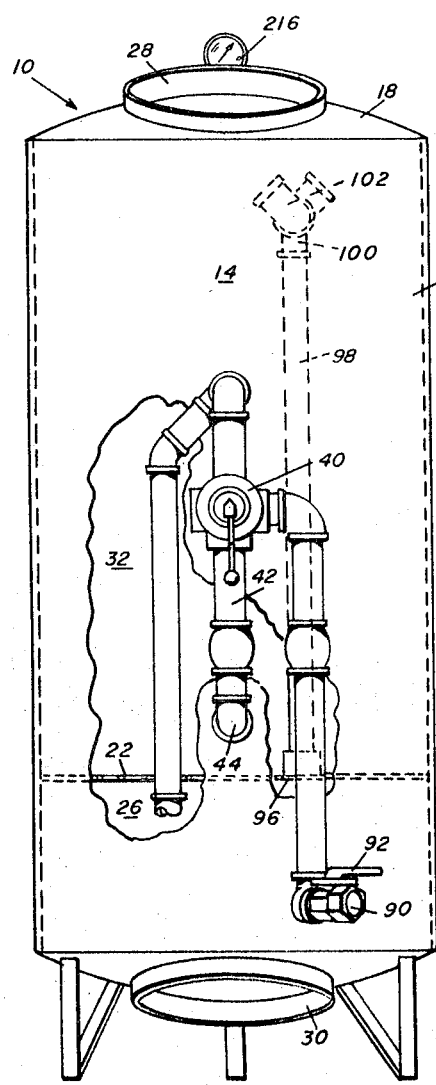
FIG. 3 is a front elevational view taken 90° from that of FIG. 1 and shows the exterior valving and conduits for the prefilter unit.
Figure 4:
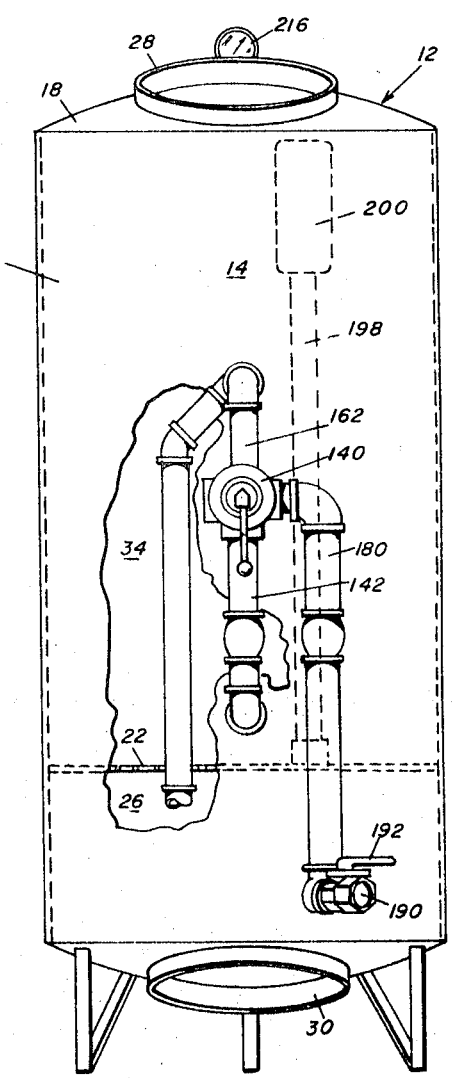
FIG. 4 is a front elevational view taken 90° from that of FIG. 1 and shows the exterior valving and conduits for the final filter unit.

As best illustrated in FIGS. 1 and 2 the filtering system of this invention comprises a prefilter unit 10 and a final filter unit 12. These two units are shown connected in tandem, obviously, they may be positioned in any relative position with respect to each other that is convenient.

Many structural features of the prefilter unit and the final filter unit are identical, hence they will be described together as follows. Each unit includes a tank 14 having a cylindrical side wall 16 with a sealed top 18 and a sealed bottom 20. Each tank has a horizontal partition 22 dividin gthe tank into an upper chamber 24 and a lower chamber 26. Openings 28 and 30 are provided in the tank top and bottom respectively to afford access to the upper and lower chambers. In the upper chamber 24 of the prefilter unit 10 a filter bed 32 of washed sand is provided. It should be noted that the filter bed 32 rests on the partition 22 and extends upwardly in the upper chamber at ½ the height thereof and in the more preferred form as much as 80% of the chamber height. In the upper chamber 24 of the final filter 12 there is provided a filter bed 34 of activated charcoal granules of various sizes. Here again the filter bed 34 extends upwardly in the upper chamber at least ½ the height thereof and in the more preferred form as much as 80% of the height.

Referring to the prefilter unit 10, said unit is provided with a multi-port valve 40 having an outlet connected to downwardly extending conduit 42 which is in turn connected to elbow 44 entering the upper chamber 24 at a position slightly above the partition 22. A horizontally disposed conduit 46 is connected to elbow 44, and at its extremity somewhat more than half way across the upper chamber, has a porous element 48 secured thereto in flow relation. This porous element 48 may be a screen arrangement or a porous mass such as a ceramic filter or the like, the only requirement being that the openings must be of sufficient size to provide rapid flow of filtered liquid therethrough and yet not allow passage of filtering material. A check valve 50 is positioned in conduit 46 immediately ahead of the porous element 48 to prevent backflow through the porous element 48.

A vertical conduit 52 is connected to conduit 46 and extends upwardly in the upper chamber to a point slightly below the upper surface of the filter bed 32. A screen element 54 or the equivalent is affixed to the end of conduit 52 to prevent the filter material from entering the conduit. This conduit is also provided with a check valve 56 biased to prevent flow downwardly therethrough. As best illustrated in FIG. 2, conduit 46 is also provided with four nozzles 58 whose outlets may be turned in various directions to provide the desired turbulence. Each nozzle 58 is provided with a check valve 60 to prevent backflow therethrough. It should be noted that check valve 56 in conduit 52 and check valves 60 in nozzles 58 all have a higher release pressure than check valve 50 in conduit 46 so that filtered liquid passing through porous element 48 and conduit 46 will not pass out through conduit 52 or nozzles 58.

Referring again to multi-port valve 40, it will be noted that this valve is also provided with an upwardly extending conduit 62 which curves and passes through the wall of the upper chamber 24 and then downwardly through the filter bed 32 and the partition 22 into the lower chamber 26. At a point slightly below the partition conduit 62 is connected to a T 64 having a horizontal projecting outlet 66 connected to conduit 68. It should be noted that a check valve 70 is provided in conduit 68 to prevent backflow therethrough. The other outlet 72 of the T 64 extends downwardly and is connected to elbow 74 and then conduit 76 which is directed generally horizontally in the lower chamber 26. A check valve 78 is provided in the passageway in outlet 72 to prevent backflow.

Multi-port valve 40 is also provided with a laterally extending conduit 80 which extends downwardly generally parallel to the tank wall 16 and at a point adjacent the lower portion of the lower chamber 26 its extremity is connected to a T 82. One side of the T outlet is connected to horizontal conduit 84 passing through the tank wall 16 and terminating with a downwardly extending elbow 86 and conduit 88. The open end of conduit 88 is immediately adjacent the bottom of the lower chamber 26. The other outlet of the T 82 has connected thereto an outwardly extending conduit 90 with a rotary plug valve 92 therein for flow control.

As best illustrated in FIG. 1 partition 22 has an opening 96 to which is connected a vertical pipe 98 extending upwardly and terminating above the upper surface of filter bed 32. A T 100 is connected to the end of pipe 98 and has like flow distributing conduits 102 extending horizontally outward from both outlets.

The final filter unit 12 is substantially like the prefilter unit 10 in that it has a multi-port valve 140 having an outlet connected to downwardly extending conduit 142 which is in turn connected to elbow 144 entering the upper chamber 24 at a position slightly above the partition 22. A hornzontally disposed conduit 146 is connected to the elbow 144 and its extremity mounts a porous element 148 secured thereto in flow relation. This porous element 148 may be a screen arrangement or a porous mass such as a ceramic filter or the like. The only requirement being that the opening must be of sufficient size to provide rapid flow of filtered liquid therethrough and yet not allow passage of filtering material from the bed 34. A check valve 150 is positioned in conduit 146 immediately ahead of the porous element 148 to prevent backflow.

As best illustrated in FIG. 2, conduit 146 is provided with four nozzles 158 whose outlets may be turned in various directions to provide the desired turbulence. Each nozzle 158 is provided with a check valve 160 to prevent backflow therethrough. It should be noted that the check valves 160 and nozzles 158 all have a higher release pressure than check valve 150 in conduit 146 for the same purpose as the corresponding valves in the prefilter unit 10.

Referring again to multi-port valve 140, there is provided an upwardly extending conduit 162 which curves and passes through the wall of the upper chamber 24 and then downwardly through the filter bed 34 and the partition 22 into the lower chamber 26. At a point slightly below the partition 22, conduit 162 is connected to a T 164 having a horizontally projecting outlet 166 connected to conduit 168. A check valve 170 is provided in conduit 168 to prevent backflow. The other outlet 172 of the T 164 extends downwardly and is connected to elbow 174 and then conduit 176 which is directed generally horizontally in the lower chamber 26. A check valve 178 is provided in outlet 172.

Multi-port valve 140 is additionally provided with a laterally extending conduit 180 which turns downwardly generally parallel to tank wall 16 and terminates at a point adjacent the lower portion of the lower chamber 26. The lower extremity of conduit 180 is connected to a T 182. One of the T outlets is connected to a horizontally extending conduit 184 passing through tank wall 16 and terminating with a downwardly extending elbow 186 and conduit 188. The open end of conduit 188 is positioned close to the bottom of the lower chamber 26. The other outlet of T 182 has connected thereto an outwardly extending conduit 190 with a rotary plug valve 192 therein for flow control.

As best illustrated in FIG. 1, partition 22 has an opening 196 to which is connected a vertical pipe 198 extending upwardly and terminating above the upper surface of filter bed 34. A porous filter element 200 is connected to the upper end of conduit 198. This porous filter element and porous filter element 148 should both have such a porosity that the liquids can readily proceed through and yet not allow the filtering material to pass.

The prefilter unit 10 is connected to the final filter unit 12 by conduit 210 which leads from the outlet 212 of multi-port valve 40 to the inlet 214 of multi-port valve 140. This connection is shown only in FIG. 2 of the drawings.

The filtering system of this invention operates as follows:

Unfiltered liquid enters prefilter multi-port valve 40, passes through conduit 62, T 64, T outlet 66 and conduit 68 is directed into lower chamber 26 in such a path that the heavier particles in the unfiltered liquid will be separated therefrom. The unfiltered liquid without the heavier particles flows upwardly through vertical conduit 98 and passes outwardly through fluid distributing conduits 102. After this, the unfiltered liquid passes down through washed sand filter bed 32 then through porous mass 48 into conduit 46, elbow 44, conduit 42 into multi-port valve 40. From multi-port valve 40 the prefiltered liquid exists through outlet 212 passing through conduit 210 into inlet 214 of final filter multi-port valve 140. From here, the prefiltered liquid passes through conduit 162, T 164 and conduit 168 into lower chamber 26 in such a path as to cause separation of any heavy foreign matter which may still be in the prefiltered liquid. After this the prefiltered liquid proceeds upwardly through vertical conduit 198 and out porous distributing element 200 in the upper portion of the upper chamber 24. From here the prefiltered liquid passes down through activated charcoal bed 34, through porous element 148, conduit 146, elbow 144, conduit 142, into multi-port valve 140, from which valve it is directed to suitable storage means.

The prefilter tank and the final filter tank are both provided with pressure gauges 216 to measure the pressure in the upper chamber of each tank. Normally these filters operate at approximately 20 pounds pressure and when the pressure reaches approximately 30 pounds, it is time to backwash. Separate and similar backwashing arrangements are provided for both the prefilter unit 10 and the final filter unit 12.

In connection with the backwashing of the prefilter unit, backwashing liquid is passed through multi-port valve 40 into conduit 42, elbow 44, conduit 46, and out through nozzles 58 to expand and agitate the filter bed 32. A thin crust like formation may at times form on the top portion of the filter bed 32. In order to effect a rapid backwashing, vertical backwashing tube 52 is used to introduce backwashing liquid up near the top portion of the filter bed to immediately break up any such crust formation. The backwash water with the foreign matter from the filter bed entrained therein passes inwardly through fluid distributing conduits 102, downwardly through conduit 98 into lower chamber 26. The backwash liquid enters the lower chamber 26 with sufficient pressure to create substantial turbulence therein so that the heavier foreign matter collected in the bottom of the lower chamber will be loosened and also entrained in the backwash liquid so as to pass outwardly through conduit 88, elbow 86, T 82, and conduit 90 to a disposal area. At the same time, the backwash liquid with the lighter elements therein will pass through conduit 76, elbow 74, T 64, conduit 62, multi-port valve 40, conduit 80 and into T 82, at which point this backwash liquid joins the other backwash liquid and is passed outwardly through conduit 90 and open valve 92.

Backwashing of the final filter unit is substantially like that of the prefilter unit wherein backwash liquid passes through multi-port valve 140, conduit 142 and out nozzles 158 to agitate and expand the activated charcoal filter bed 34. As the backwashing operation continues backwashing liquid with the foreign matter from the activated charcoal entrained therein passes through porous element 200 downwardly through conduit 198 into lower chamber 26. Here again, the force of the backwash liquid entering lower chamber 26 is sufficient to stir up any heavy foreign matter in the bottom of the lower chamber so that it may be taken up with the backwash liquid and pass outwardly through conduit 188, elbow 186, conduit 184, T 182, and conduit 190 with open valve 192 therein. Simultaneously, the backwashing liquid with the lighter foreign matter therein passes through conduit 176, elbow 174, T 164, conduit 162, multi-port valve 140, down through conduit 180 into T 182 where it meets the other flow of backwashing liquid and is carried out through conduit 190 passing through valve 192.

All of the valves in the system work in a conventional manner, for example, when the filtering operation is taking place, the rotary plug valves 92 and 192 will be closed. Likewise check valves 56 and 78 in the prefilter unit and check valve 178 in the final filter unit will be closed. The check valves 60 in nozzles 58, as well as check valves 160 in nozzles 158, will also be closed. Check valves 50 and 70 in the prefilter unit together with check valves 150 and 170 in the final filter unit will be open. In the backwashing operation the positions of the valves will be reversed from that above, namely, valves 92, 192, 56, 78, 178, 60 and 160 will be open and valves 50, 70, 150 and 170 will be closed.

In order to more clearly indicate the flow path for the filtering and backwashing cycles, and further since the filtering and backwashing in the prefilter unit and the final filter unit are substantially alike, flow arrows have been placed on the prefilter unit 10 of FIG. 1 showing the backwashing cycle while arrows have been placed on the final filter unit 12 of FIG. 1 to indicate the filtering cycle.

It should be noted that numerous changes can be made to the aforedescribed apparatus and operation without departing from the scope of this invention. Other suitable filtering materials may be substituted for the washed sand and activated charcoal granules disclosed herein. Furthermore, the operation of the entire system may be made automatic or semi-automatic as desired.

What is claimed is:

1. A filter particularly adapted for a liquid filter system, said filter comprising a tank having vertical side walls and a top and bottom, a horizontal partition dividing the tank into an upper chamber and a lower chamber, a filter bed in the upper chamber extending upwardly from the partition at least one-half the height of said upper chamber, feed conduit means for unfiltered liquid extending through the tank into the lower chamber for directing the unfiltered liquid in a path within said lower chamber to produce a separation of the heavier impurities from the unfiltered liquid, the horizontal partition having an opening therein connecting the upper and lower chambers, a vertical conduit connected to said partition at the opening in said partition for alternately directing unfiltered liquid upwardly therethrough and backwash liquid downwardly therethrough, said vertical conduit terminating short of the tank top, the upper end of the vertical conduit having means thereon for alternately distributing the upward flowing liquid over the filter bed and receiving the backwash liquid said last-named means on the upper end of said vertical conduit comprising a porous element for preventing the withdrawal of filtering materials during the backwash operation, conduit means in the lower portion of the upper chamber and extending outside of the tank for alternately withdrawing the filtered liquid and introducing the backwashing liquid adjacent the bottom of the filter bed, said conduit means including a porous element on the end thereof with said upper chamber for receiving the filtered liquid, a check valve in the last-named conduit means immediately ahead of said last-named porous element to prevent flow outwardly through said porous element, and a plurality of nozzles on said last-named conduit means each having a check valve to prevent blackflow, said nozzles directing backwash liquid into the lower portion of the filter bed to expand and agitate the same.

2. The invention set forth in claim 1, wherein the check valves in said nozzles are biased to open at a higher pressure than the aforesaid check valve immediately ahead of said porous element.

3. The invention as set forth in claim 1, and wherein said conduit means in the lower portion of the upper chamber includes a vertical pipe whose upper end is below the upper surface of the filter bed and has a check valve therein biased to the same degree and direction as those of the backwash nozzles so as to furnish backwash liquid to the upper zone of the filter bed.

References Cited

UNITED STATES PATENTS

| | | | |
|---|---|---|---|
| 654,479 | 7/1900 | McNally | 210—279 X |
| 656,043 | 8/1900 | Paterson | 210—279 X |
| 1,119,008 | 12/1914 | Gibson | 210—279 X |
| 2,209,602 | 7/1940 | Jewell | 210—136 |
| 2,773,829 | 12/1956 | Hunting | 210—279 X |
| 3,384,240 | 5/1968 | Berardi | 210—279 X |

SAMIH N. ZAHARNA, Primary Examiner

U.S. Cl. X.R.

210—136, 252, 279, 289